J. H. & W. J. KILLEY.
Improvement in Steam-Boiler Alarms.
No. 132,967.  Patented Nov. 12, 1872.
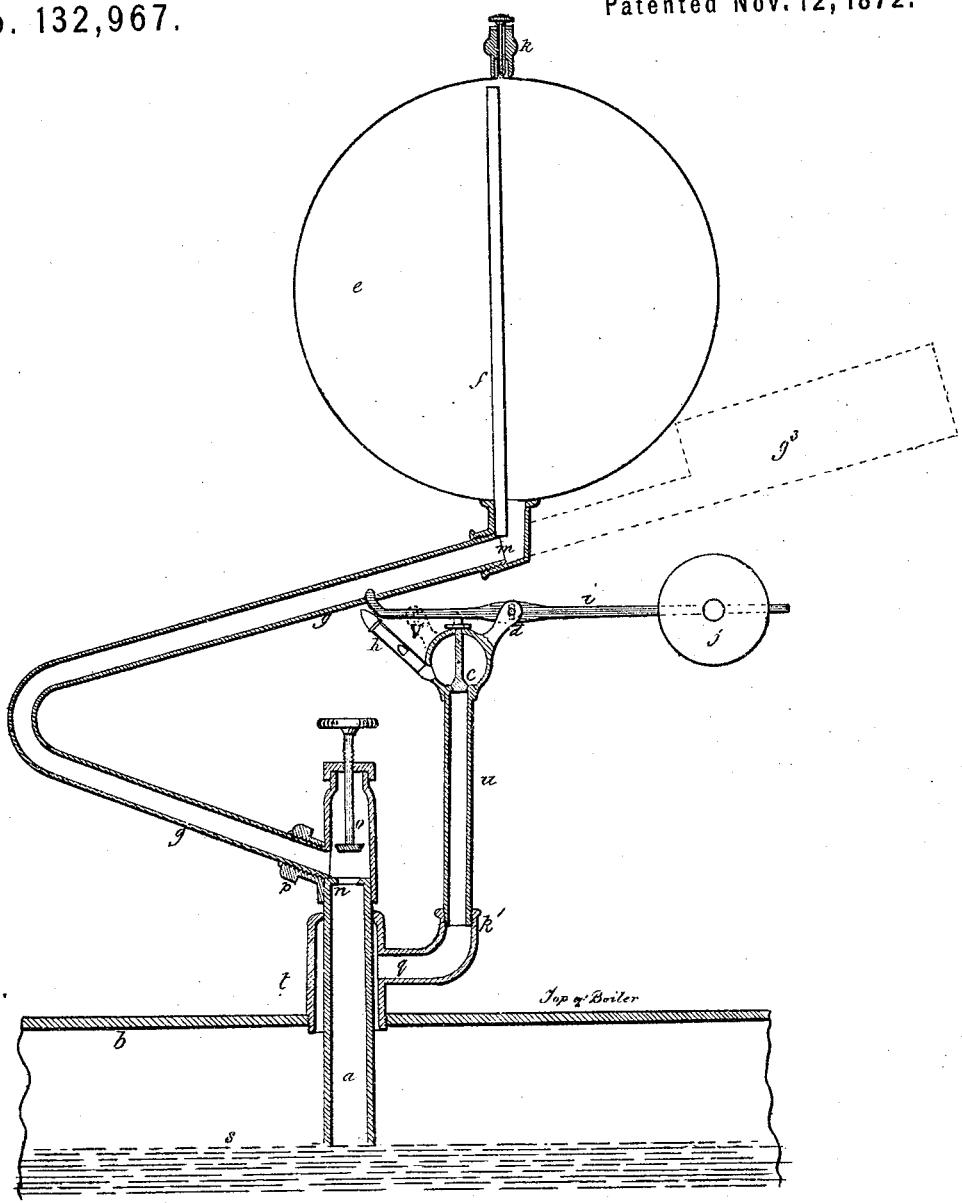
Witnesses
Inventors

UNITED STATES PATENT OFFICE.

JOSEPH H. KILLEY AND WILLIAM J. KILLEY, OF HAMILTON, CANADA, ASSIGNORS OF PART INTEREST TO THOS. PIPER, OF SAME PLACE.

IMPROVEMENT IN STEAM-BOILER ALARMS.

Specification forming part of Letters Patent No. 132,967, dated November 12, 1872.

*To all whom it may concern:*

Be it known that we, JOSEPH HENRY KILLEY, of the city of Hamilton, in the county of Wentworth, in the Province of Ontario, Canada, and WILLIAM JOHN KILLEY, of the same place, have invented certain Improvements on our Steam-Boiler Alarm, patented by us in the United States February 6, 1872, No. 123,484, of which the following is a specification:

The object of the improvement is to perfect our original apparatus as above patented, which was constructed so that the water acted directly on the valve attached to the whistle, the objection to which was the discharge of water when indicating the various conditions of the boiler. Our improvement corrects this difficulty.

Figure 1 represents the improved device, by reference to which it will be seen that $b$ represents a section of a boiler; $s$, the water. $t$ represents a tube, as shown, screwed into the top of the boiler. Inside of said tube is a second one, $a$, passing down into the boiler to the level of the water. Upon the top of the tube is a valve, $o$, and valve-seat $n$. Secured to the tube $a$ is a spring tube, $g$, or it may be a coil, on the top of which is fastened the circular globe $e$, with a tube, $f$, inside, as shown. The tube $t$, which is screwed into the boiler, has a hollow arm, $k'$, on its right side, as shown, into which is secured the tube $u$. Upon the top of the said tube is a circular hollow head containing a valve, $c$, a whistle, $h$, and an upward projection, $d$, for pivoting the balance-lever $i$. The left end of said lever is curved upward and forked to support the pipe or coil $g$ and globe $e$. At the other end of the lever is a sliding weight, $j$, which can be placed on the graduated arm, so as to blow off steam at any desired pressure. The valve $c$ is attached to the balance-lever, as shown. The tube $f$ in the globe, which conveys steam to the top of the globe, may be used or dispensed with, as found necessary. By the reversion of the fulcrum on the lever, as shown by dotted lines $v$, the apparatus can be made to whistle high water as well as low by adding a pipe from high-water level in the boiler to the globe $e$.

The action of the apparatus is as follows: The device is placed on an ordinary steam-boiler, as shown on the drawing. On the steam being got up and the water covering the mouth of the pipe $a$ the pressure of steam on the water $s$ forces it into the globe $e$. The weight of the said globe, in consequence of the elastic action of the tube $g$, presses on the end of the lever $i$ acting on the valve $c$, and preventing the steam from escaping through the valve $c$ until the pressure of the steam overcomes the weight of the globe and water, when the steam will escape through the valve and also through the whistle, sounding the alarm for high steam. When in the ordinary course of evaporation the water leaves the end of the pipe $a$ the water will escape from the globe by gravitation, thereby relieving the valve $c$ of pressure, and thus sounds the low-water alarm. From the same cause the difference in the density of the water when foaming causes the alarm to sound. The stop-valve $o$ is for the purpose of shutting off the water, if required. The spring action of the tube $g$ may be applied by a spiral coil or otherwise for the purpose. The globe $e$ may be dispensed with and the tube $g$ extended and enlarged at the end, as shown at $g^3$.

What we claim as our improvement in steam-boiler alarms, and wish to secure by Letters Patent, is—

The combination, with the boiler $b$, of the pipes $t$ and $u$, the latter provided with valve $c$, whistle $h$, and shifting-lever $i$, the elastic tube $g$, globe $e$, or enlargement $g^3$ and pipe $a$, all arranged substantially as and for the purpose specified.

Hamilton, Canada, March 30, 1872.

J. H. KILLEY.
W. J. KILLEY.

Signed in the presence of—
WM. BRUCE,
P. L. SCRIVEN.